US011353762B2

(12) United States Patent
Shin et al.

(10) Patent No.: US 11,353,762 B2
(45) Date of Patent: Jun. 7, 2022

(54) DISPLAY DEVICE

(71) Applicant: Samsung Display Co., Ltd., Yongin-Si (KR)

(72) Inventors: Dong Hee Shin, Asan-si (KR); Geunho Lee, Hwaseong-si (KR); Yonghee Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/179,750

(22) Filed: Feb. 19, 2021

(65) Prior Publication Data

US 2021/0382338 A1   Dec. 9, 2021

(30) Foreign Application Priority Data

Jun. 9, 2020 (KR) ........................ 10-2020-0069516

(51) Int. Cl.
*G02F 1/1362* (2006.01)
*G02F 1/1368* (2006.01)

(52) U.S. Cl.
CPC ...... *G02F 1/1368* (2013.01); *G02F 1/136286* (2013.01)

(58) Field of Classification Search
CPC .............................................. G02F 1/136213
See application file for complete search history.

(56) References Cited

U.S. PATENT DOCUMENTS

| 2011/0261307 A1* | 10/2011 | Shin ................. G02F 1/133753 349/123 |
| 2015/0009465 A1* | 1/2015 | Park ..................... G02F 1/1393 349/139 |
| 2016/0322397 A1* | 11/2016 | Lee ..................... H01L 27/1248 |

FOREIGN PATENT DOCUMENTS

KR   10-1675372 B1   11/2016

* cited by examiner

*Primary Examiner* — Sang V Nguyen
(74) *Attorney, Agent, or Firm* — Innovation Counsel LLP

(57) ABSTRACT

A display device comprises a first pixel including a first transistor including a first control electrode, a first input electrode, and a first output electrode spaced apart from the first input electrode and a first pixel electrode connected to the first output electrode, a second pixel adjacent to the first pixel in a first direction and including a second transistor including a second control electrode, a second input electrode, and a second output electrode spaced apart from the second input electrode and a second pixel electrode connected to the second output electrode, and a scan line for providing a scan signal to the first and second control electrodes. The first and second input electrodes are disposed in a second direction intersecting the first direction from the first and second output electrodes, respectively, and the first input electrode includes a first extension portion extending toward the second output electrode.

21 Claims, 11 Drawing Sheets

DISPLAY DEVICE

CROSS-REFERENCE TO RELATED APPLICATION

This application claims priority under 35 USC § 119 to Korean Patent Application No. 10-2020-0069516 filed on Jun. 9, 2020 in the Korean Intellectual Property Office (KIPO), the entire disclosure of which is incorporated herein by reference.

BACKGROUND

1. Field

The present disclosure relates to a display device. More particularly, the present disclosure relates to a display device capable of reducing a capacitance deviation between pixels and data lines.

2. Description of the Related Art

The importance of a display device has been increasing with a development of multimedia. Accordingly, various types of display devices, such as liquid crystal displays (LCD) and organic light emitting displays (OLED), are widely used in different types of electronic devices including portable devices such as a smart phone, a smart watch, or smart pad etc.

Among them, the liquid crystal display (LCD) is still one of the most widely used flat panel displays. Generally, the liquid crystal display device may include two display plates on which electric field generating electrodes are formed respectively and a liquid crystal layer interposed therebetween. Electric field may be generated in the liquid crystal layer by applying a voltage to the electric field generating electrodes. Accordingly, the alignment of the liquid crystal molecules in the liquid crystal layer is determined, and the polarization of incident light is controlled, so that the liquid crystal display device may display an image.

SUMMARY

Embodiments provide a display device for reducing a capacitance deviation between pixels and data lines.

A display device according to one embodiment may include a first pixel including a first transistor including a first control electrode, a first input electrode, and a first output electrode spaced apart from the first input electrode and a first pixel electrode connected to the first output electrode, a second pixel adjacent to the first pixel in a first direction and including a second transistor including a second control electrode, a second input electrode, and a second output electrode spaced apart from the second input electrode and a second pixel electrode connected to the second output electrode, and a scan line for providing a scan signal to the first control electrode and the second control electrode. The first input electrode and the second input electrode may be disposed in a second direction intersecting the first direction from the first output electrode and the second output electrode, respectively, and the first input electrode may include a first extension portion extending toward the second output electrode.

In one embodiment, the first extension portion may include a first portion extending in a third direction opposite to the second direction.

In one embodiment, the first extension portion may further include a second portion extending from the first portion in a fourth direction opposite to the first direction.

In one embodiment, the first output electrode may include a first contact portion coming into contact with the first pixel electrode and disposed in the fourth direction from the first input electrode, and the second output electrode includes a second contact portion coming into contact with the second pixel electrode and disposed in the first direction from the second input electrode.

In one embodiment, the second portion may be disposed between the first output electrode and the second contact portion.

In one embodiment, a capacitance between the first contact portion and the second input electrode may be substantially equal to a capacitance between the second contact portion and the first extension portion.

In one embodiment, the display device may further include a first storage line overlapping the first pixel electrode and parallel to the scan line and a second storage line overlapping the second pixel electrode and parallel to the scan line.

In one embodiment, the first storage line may include a first storage electrode protruding in the first direction to overlap the first contact portion, and the second storage line includes a second storage electrode protruding in the fourth direction to overlap the second contact portion.

In one embodiment, the display device may further include a first data line extending in the first direction and providing a first data signal to the first input electrode and a second data line extending in the first direction and providing a second data signal to the second input electrode.

In one embodiment, the first pixel electrode may include a second extension portion extending to overlap the second input electrode.

In one embodiment, the first pixel electrode may include a stem portion extending in the first direction and a branch portion extending from the stem portion, and the second extension portion protrudes from the branch portion.

In one embodiment, a capacitance between the first data line and the first output electrode may be substantially equal to a capacitance between the second input electrode and the second extension portion.

In one embodiment, the second pixel electrode may include a third extension portion extending to overlap the first input electrode.

In one embodiment, the second pixel electrode may include a stem portion extending in the first direction and a branch portion extending from the stem portion, and the third extension portion protrudes from the branch portion.

In one embodiment, a capacitance between the second data line and the second output electrode may be substantially equal to a capacitance between the first input electrode and the third extension portion.

A display device according to one embodiment may include a first pixel including a first transistor including a first control electrode, a first input electrode, and a first output electrode spaced apart from the first input electrode, and a first pixel electrode connected to the first output electrode, a second pixel adjacent to the first pixel in a first direction and including a second transistor including a second control electrode, a second input electrode, and a second output electrode spaced apart from the second input electrode, and a second pixel electrode connected to the second output electrode, a scan line for providing a scan signal to the first control electrode and the second control electrode, a first data line extending in the first direction and providing a first data signal to the first input electrode, and a second data line extending in the first direction and providing a second data signal to the second input electrode. The first pixel electrode may include a second extension portion extending to overlap the second input electrode.

In one embodiment, a capacitance between the first data line and the first output electrode may be substantially equal to a capacitance between the second input electrode and the second extension portion.

In one embodiment, the second pixel electrode may include a third extension portion extending to overlap the first input electrode.

In one embodiment, a capacitance between the second data line and the second output electrode may be substantially equal to a capacitance between the first input electrode and the third extension portion.

A display device according to one embodiment may include a first pixel including a first transistor including a first control electrode, a first input electrode, and a first output electrode spaced apart from the first input electrode, and a first pixel electrode connected to the first output electrode, a second pixel adjacent to the first pixel in a first direction and including a second transistor including a second control electrode, a second input electrode, and a second output electrode spaced apart from the second input electrode, and a second pixel electrode connected to the second output electrode, a scan line for providing a scan signal to the first control electrode and the second control electrode, a first data line extending in the first direction and providing a first data signal to the first input electrode, and a second data line extending in the first direction and providing a second data signal to the second input electrode. The second pixel electrode may include a third extension portion extending to overlap the first input electrode.

In one embodiment, a capacitance between the second data line and the second output electrode may be substantially equal to a capacitance between the first input electrode and the third extension portion.

In the display device according to the embodiments, the first input electrode and the second input electrode may be disposed in the same direction from the first output electrode and the second output electrode, respectively, and the first input electrode may include the first extension portion extending toward the second output electrode, so that deviation between a capacitance between the first pixel and the second data line and a capacitance between the second pixel and the first data line may be reduced, and the image quality properties of the display device may be improved.

In the display device according to the embodiments, the first pixel electrode may include the second extension portion extending to overlap the second input electrode, so that deviation between a capacitance between the first pixel and the first data line and a capacitance between the first pixel and the second data line may be reduced, and the image quality properties of the display device may be improved.

In the display device according to the embodiments, the second pixel electrode may include the third extension portion extending to overlap the first input electrode, so that deviation between a capacitance between the second pixel and the first data line and a capacitance between the second pixel and the second data line may be reduced, and the image quality properties of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, display devices in accordance with embodiments will be explained in detail with reference to the accompanying drawings.

Figure 1:
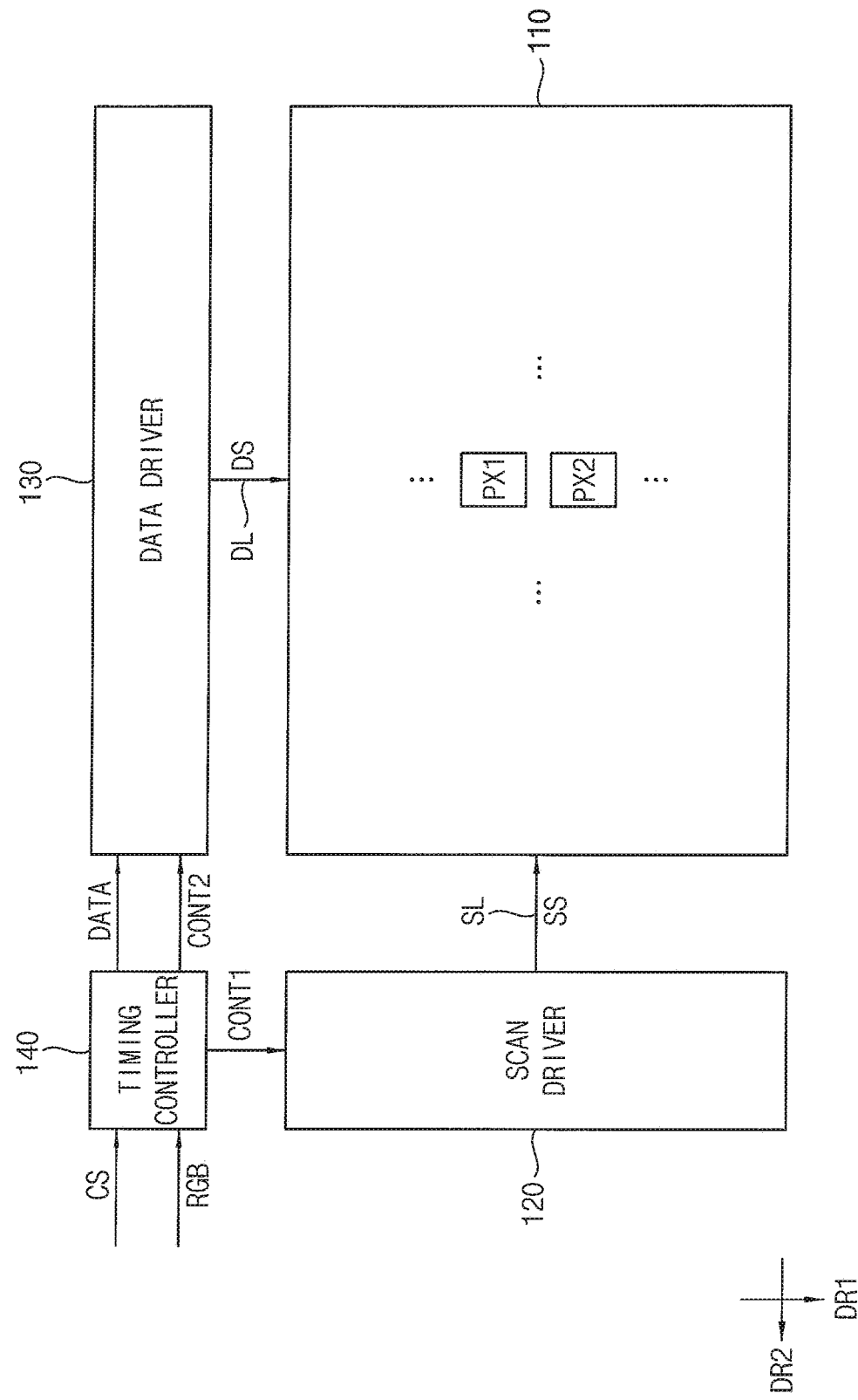
FIG. 1 is a block diagram showing a display device according to one embodiment of the present disclosure.

FIG. 1 is a block diagram showing a display device according to one embodiment of the present disclosure.

Referring to FIG. 1, the display device according to one embodiment of the present disclosure may include a display unit 110, a scan driver 120, a data driver 130, and a timing controller 140.

The display unit 110 may display an image. A plurality of pixels including a first pixel PX1 and a second pixel PX2 may be disposed in the display unit 110. The pixels may be arranged in a matrix form along a first direction DR1 and a second direction DR2 intersecting the first direction DR1.

Each of the pixels may be electrically connected to one of scan lines SL and one of data lines DL. The data lines DL may extend in the first direction D1. In addition, the scan lines SL may extend in the second direction D2. For example, as shown in FIG. 1, the first direction DR1 may be a column direction, and the second direction DR2 may be a row direction.

The scan driver 120 may generate a scan signal SS based on a first control signal CONT1 provided from the timing controller 140. The scan driver 120 may provide the scan signal SS to the pixels disposed in the display unit 110 through the scan lines SL. In one embodiment, the scan driver 120 may include a plurality of transistors. In another embodiment, the scan driver 120 may be an integrated circuit.

The data driver 130 may be provided with a second control signal CONT2 and image data DATA from the timing controller 140. The data driver 130 may generate a data signal DS based on the second control signal CONT2 and the image data DATA. The data driver 130 may provide the data signal DS to the pixels disposed in the display unit 110 through the data lines DL. In one embodiment, the data driver 130 may include a shift register, a latch, a digital-analog converter, and the like.

The timing controller 140 may be provided with an image signal RGB and a control signal CS from the an external device. The timing controller 140 may generate image data DATA, a first control signal CONT1, and a second control signal CONT2 by processing the image signal RGB and the control signal CS to suit the operating conditions of the display unit 110.

The image signal RGB may include gray scale data provided to the display unit 110. In addition, the control signal CS may include a horizontal synchronization signal, a vertical synchronization signal, a main clock signal, and the like. The horizontal synchronization signal may represent a time required to display one row of the display unit 110. The vertical synchronization signal may represent a time required to display an image of one frame. The main clock signal may be a signal that serves as a reference for generating signals after the timing control unit 140 is synchronized with the scan driver 120 and the data driver 130.

Figure 2:
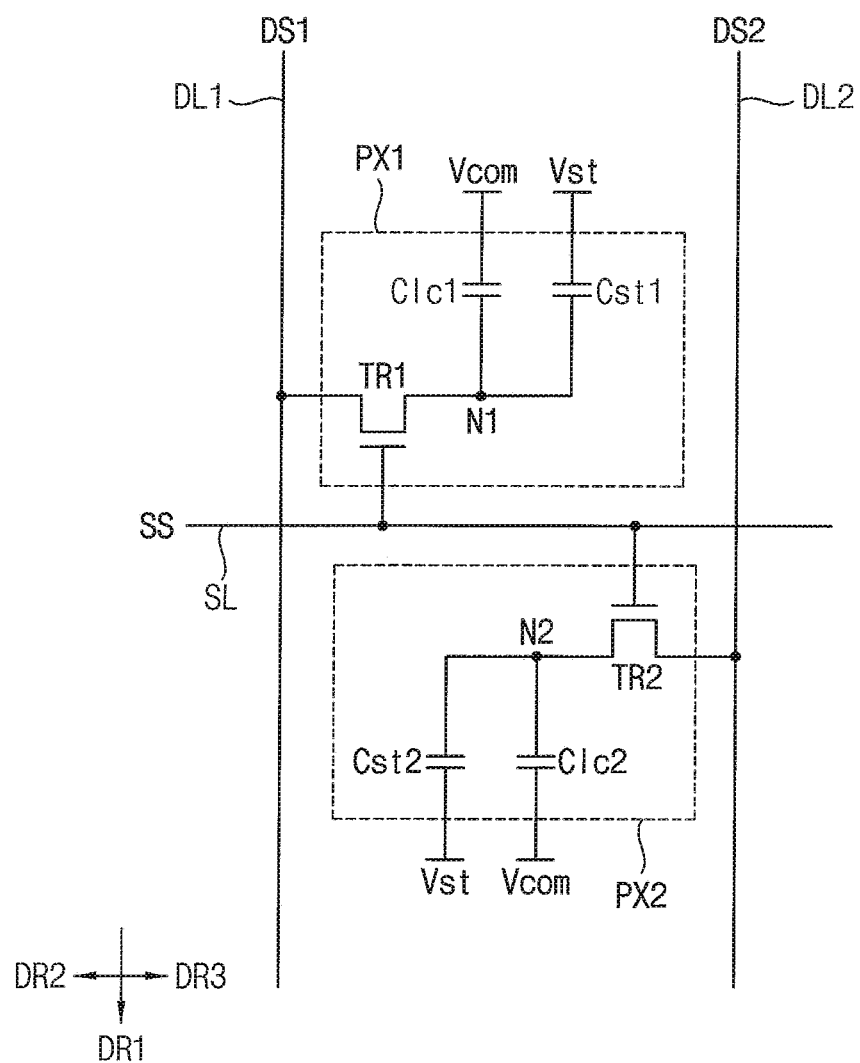
FIG. 2 is a circuit diagram showing a first pixel and a second pixel of FIG. 1.

FIG. 2 is a circuit diagram showing a first pixel PX1 and a second pixel PX2 of FIG. 1.

Referring to FIG. 2, the display device may include a first pixel PX1 and a second pixel PX2. The second pixel PX2 may be adjacent to the first pixel PX1 in the first direction DR1. Accordingly, the first pixel PX1 and the second pixel PX2 may be included in one pixel row.

The first pixel PX1 and the second pixel PX2 may be provided with different data signals from different data lines. For example, the first pixel PX1 may be provided with a first data signal DS1 from a first data line DL1, and the second pixel PX2 may be provided with a second data signal DS2 different from the first data signal DS1 from a second data line DL2. The first data line DL1 may be disposed in the second direction DR2 from the first pixel PX1 and the second pixel PX2, and may extend in the first direction D1. The second data line DL2 may be disposed in a third direction DR3 opposite to the second direction DR2 from the first pixel PX1 and the second pixel PX2, and may extend in the first direction D1.

The first pixel PX1 and the second pixel PX2 may be provided with the same scan signal from the same scan line. For example, the first pixel PX1 and the second pixel PX2 may be provided with a scan signal SS from the scan line SL. The scan line SL may be disposed between the first pixel PX1 and the second pixel PX2, and may extend in the second direction D2.

Each of the first pixel PX1 and the second pixel PX2 may include a transistor, a liquid crystal capacitor, and a storage capacitor. The first pixel PX1 may include a first transistor TR1, a first liquid crystal capacitor Clc1, and a first storage capacitor Cst1, and the second pixel PX2 may include a second transistor TR2, a second liquid crystal capacitor Clc2, and a second storage capacitor Cst2. Hereinafter, it will be described in detail based on the first pixel PX1 since the second pixel PX2 has a similar configuration as the first pixel PX1.

The first transistor TR1 may include a control electrode, an input electrode, and an output electrode. The control electrode of the first transistor TR1 may be connected to the scan line SL. The input electrode of the first transistor TR1 may be connected to the first data line DL1, and the output electrode of the first transistor TR1 may be connected to a first node N1. The first transistor TR1 may perform a switching operation based on the scan signal SS provided from the scan line SL, and provide the first data signal DS1 provided from the first data line DL1 to the first node N1. The first liquid crystal capacitor Clc1 may be formed between the first node N1 and a common electrode CM (shown in FIG. 8) to which a common voltage Vcom is provided.

The first storage capacitor Cst1 may be formed between the first node N1 and a first storage line RL1 (shown in FIG. 3) to which a storage voltage Vst is provided.

Hereinafter, an operation of the display device according to one embodiment of the present disclosure will be described based on the first pixel PX1 and the second pixel PX2.

The first transistor TR1 may perform a switching operation based on the scan signal SS, and the second transistor TR2 may perform a switching operation based on the scan signal SS. Accordingly, the first transistor TR1 and the second transistor TR2 may perform the same switching operation. However, since the first transistor TR1 is connected to the first data line DL1, but the second transistor TR2 is connected to the second data line DL2, the first node N1 and the second node N2 may be provided with mutually different data signals. In other words, the first node N1 and the second node N2 may be provided with different data signals simultaneously. Accordingly, since the scan signal SS may be simultaneously provided to the first pixel PX1 and the second pixel PX2, a gate delay may decrease. Accordingly, the display device according to one embodiment of the present disclosure may also be applied to high-resolution products that require high-frequency driving.

Figure 3:
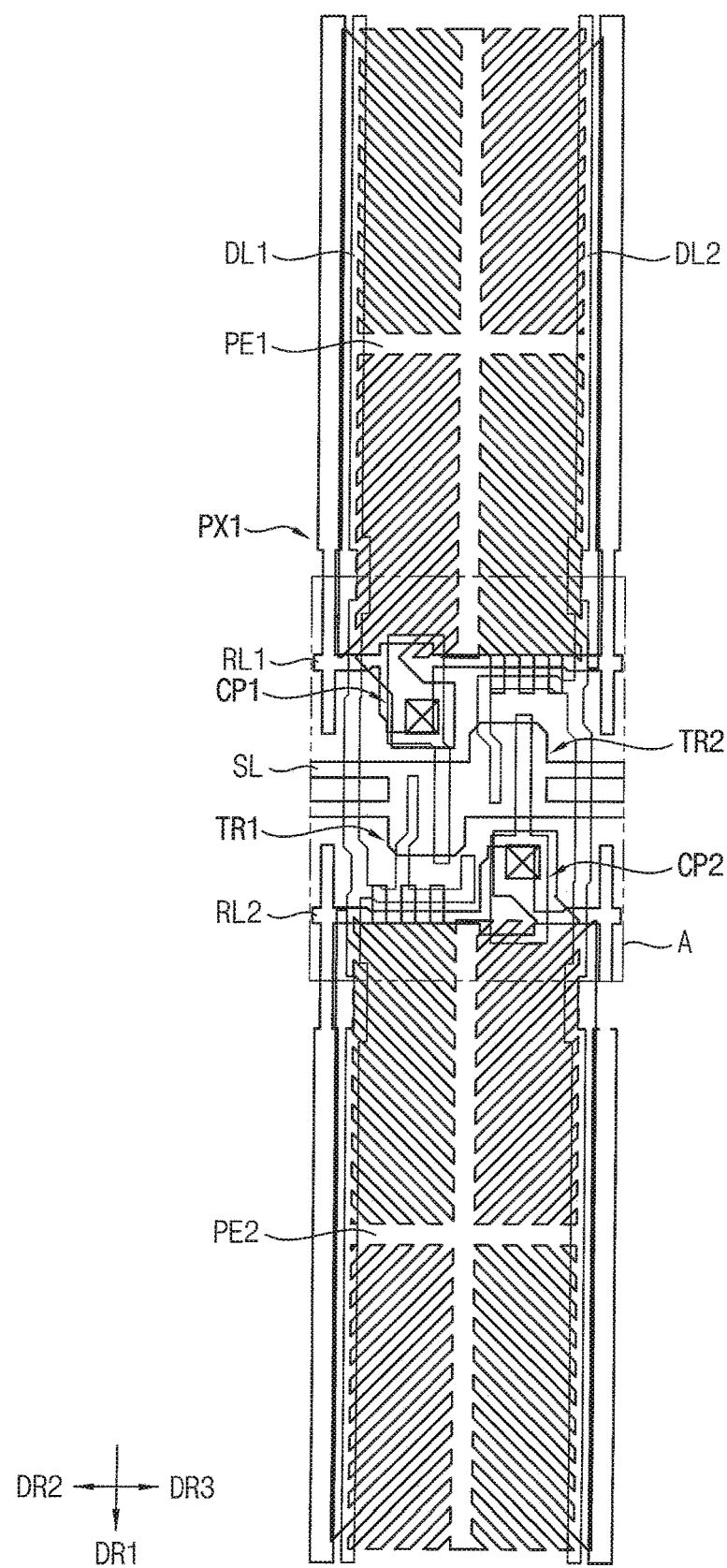
FIG. 3 is a layout diagram showing the first pixel and the second pixel of FIG. 1.
Figure 4:
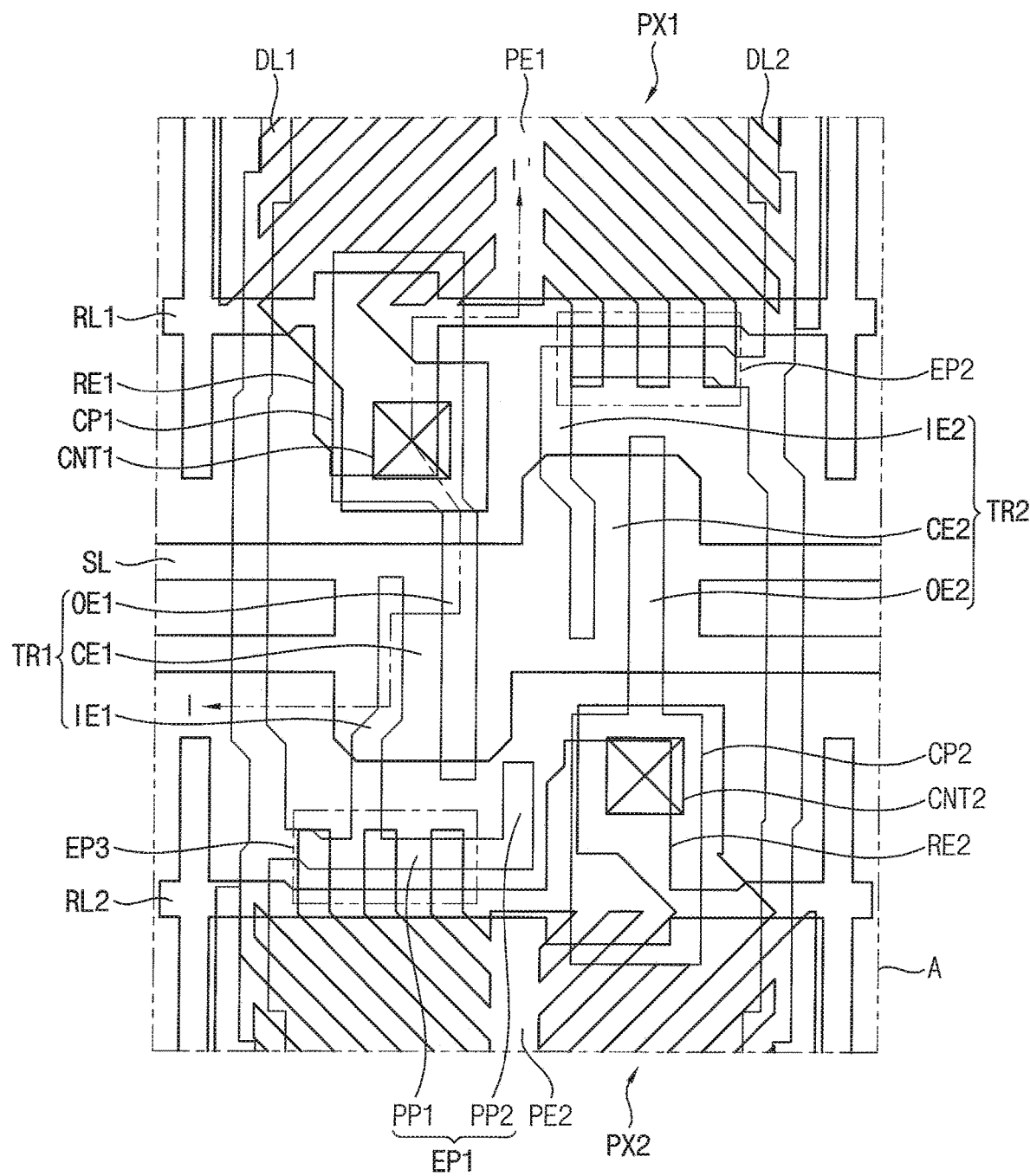
FIG. 4 is a layout view showing area A of FIG. 3.
Figure 5:
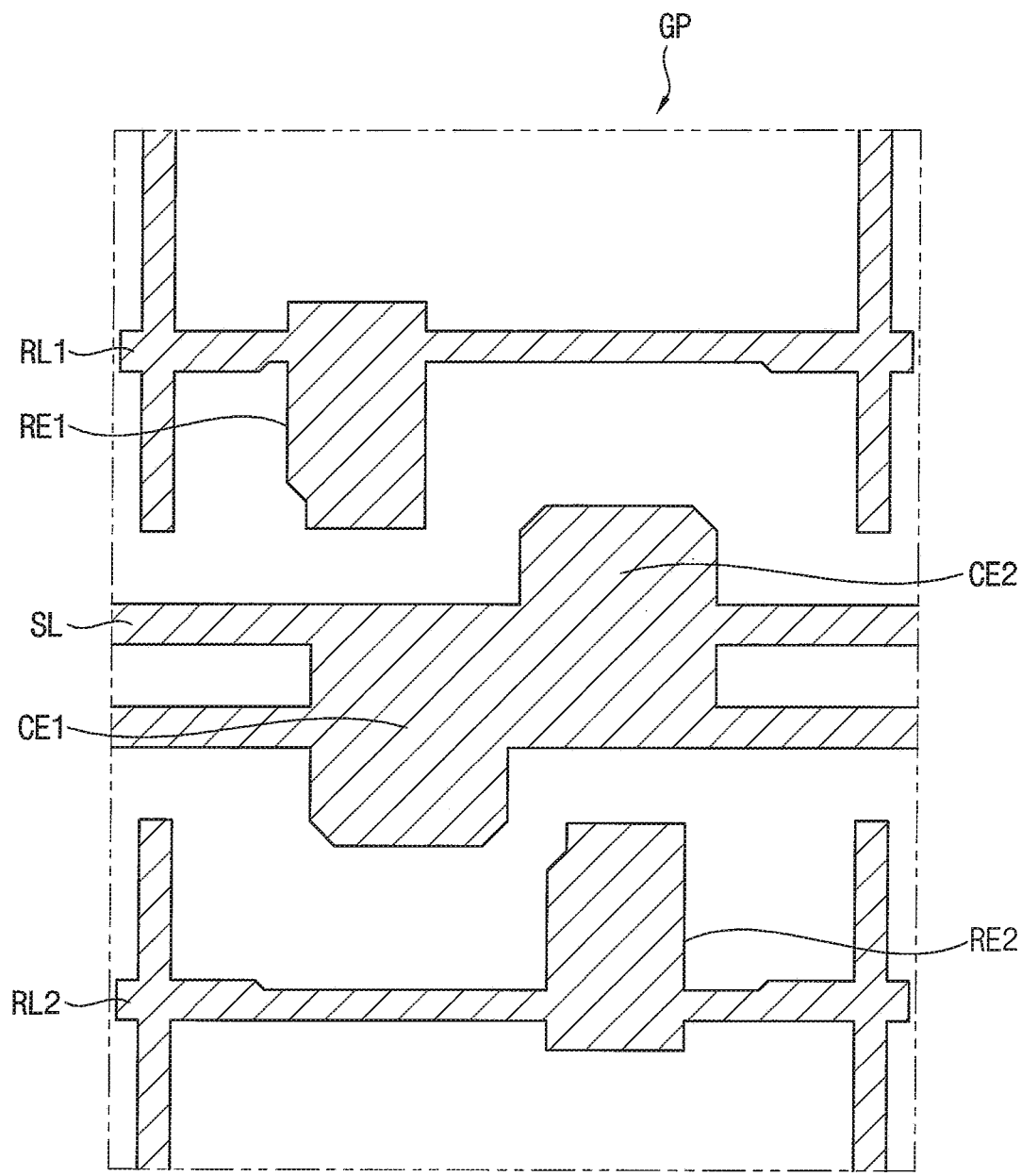
FIG. 5 is a view showing a gate pattern included in the first pixel and the second pixel of FIG. 4.
Figure 6:
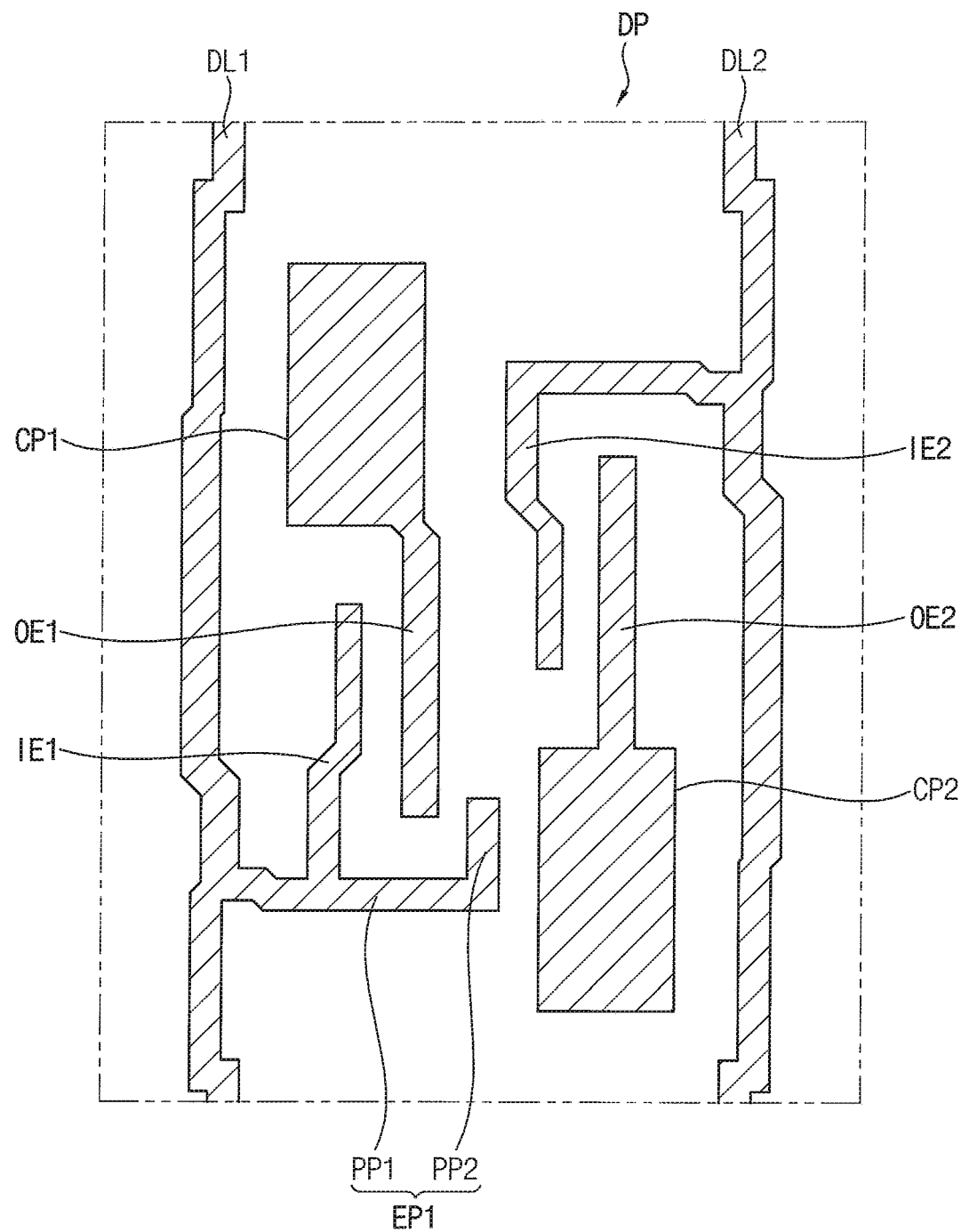
FIG. 6 is a view showing a data pattern included in the first pixel and the second pixel of FIG. 4.
Figure 7:
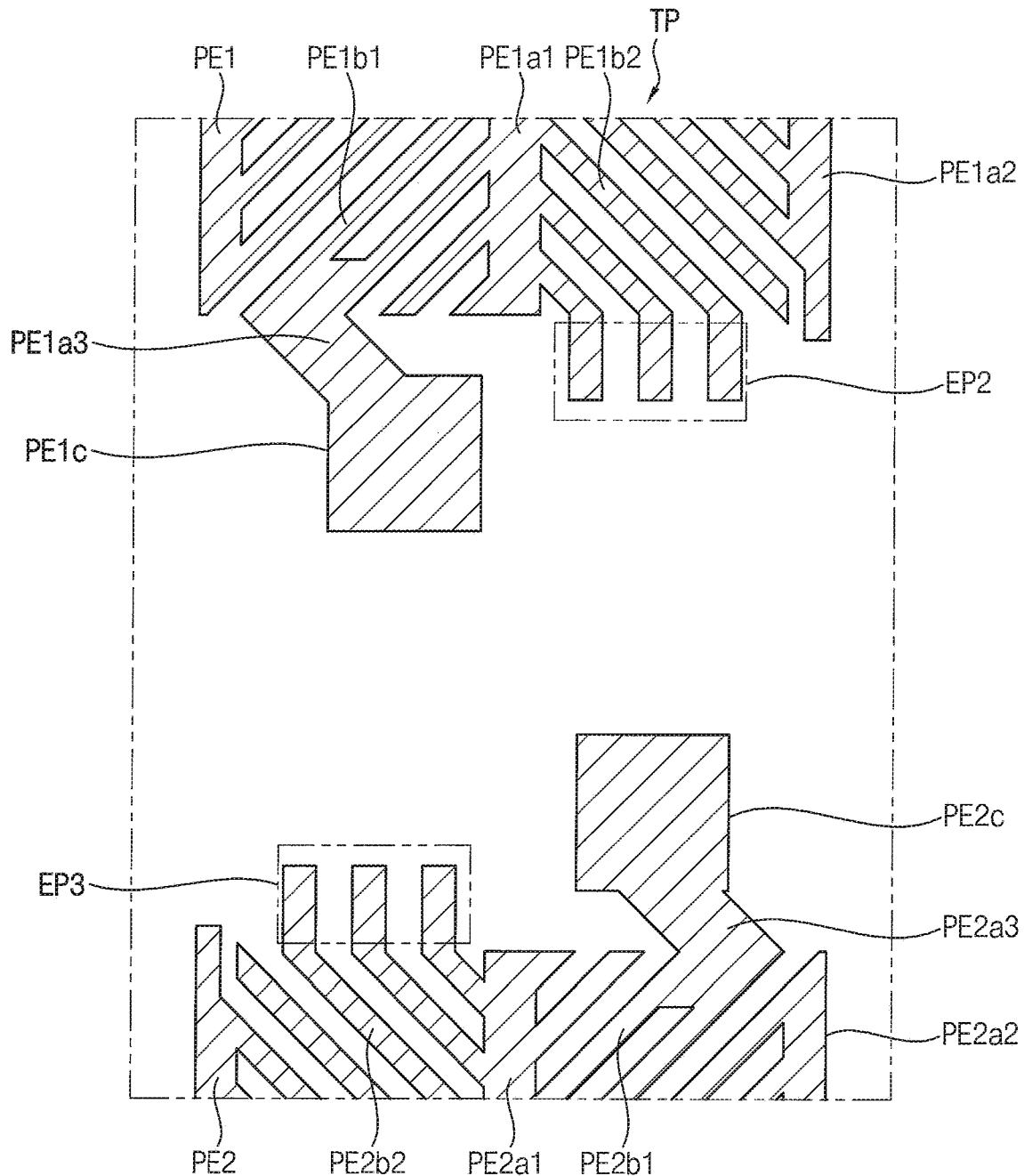
FIG. 7 is a view showing a transparent conductive pattern included in the first pixel and the second pixel of FIG. 4.
Figure 8:
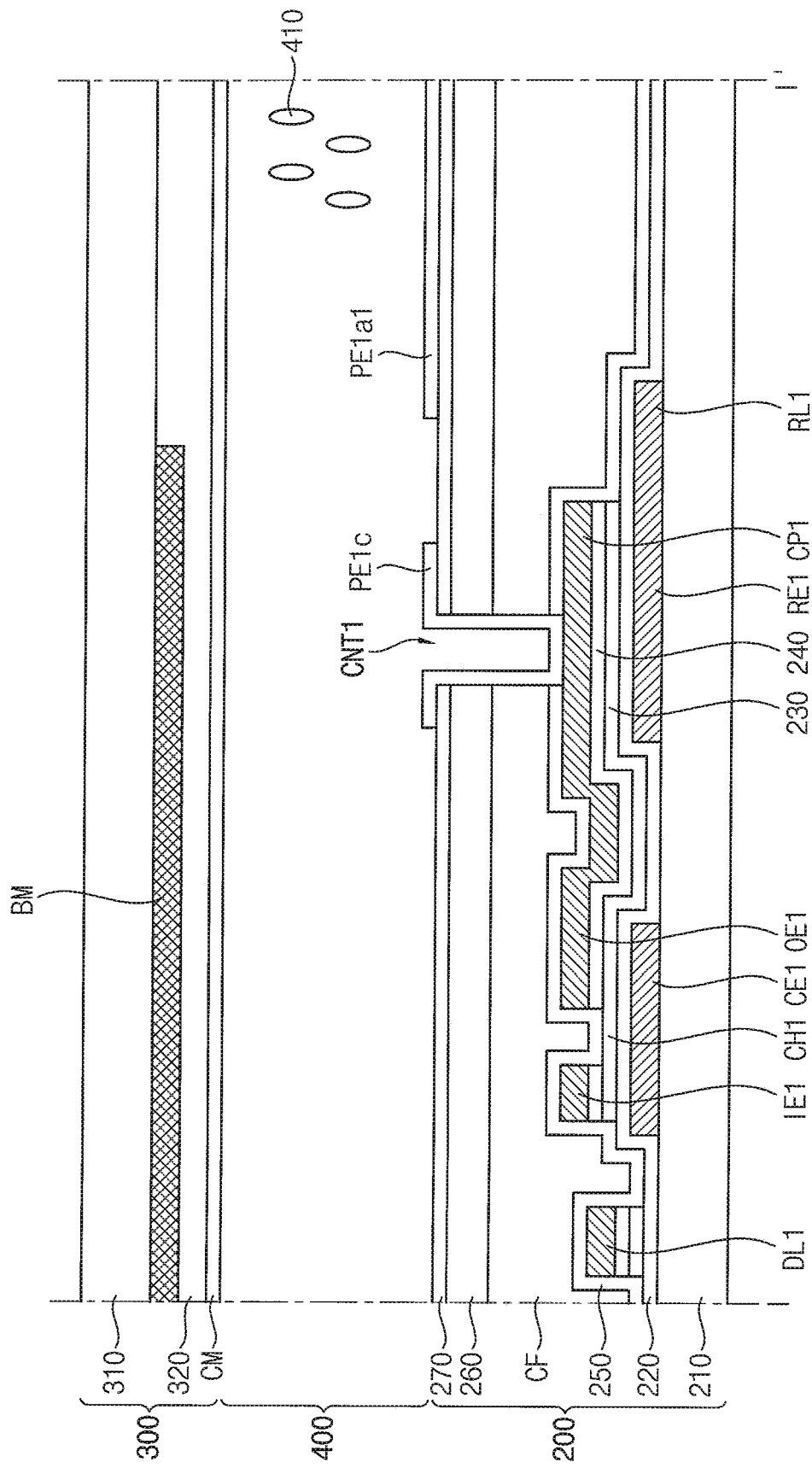
FIG. 8 is a sectional view taken along line I-I' of FIG. 4.

FIG. 3 is a layout diagram showing the first pixel PX1 and the second pixel PX2 of FIG. 1. FIG. 4 is a layout view showing area A of FIG. 3. FIG. 5 is a view showing a gate pattern included in the first pixel PX1 and the second pixel PX2 of FIG. 4. FIG. 6 is a view showing a data pattern included in the first pixel PX1 and the second pixel PX2 of FIG. 4. FIG. 7 is a view showing a transparent conductive pattern included in the first pixel PX1 and the second pixel PX2 of FIG. 4. FIG. 8 is a sectional view taken along line I-I' of FIG. 4.

Referring to FIGS. 3, 4, 5, 6, 7, and 8, the display device may include a first display plate 200, a second display plate 300, and a liquid crystal layer 400.

The first display plate 200 and the second display plate 300 may be disposed to face each other. The liquid crystal layer 400 may be disposed between the first display plate 200 and the second display plate 300. The liquid crystal layer 400 may include a plurality of liquid crystal molecules 410. In one embodiment, the first display plate 200 and the second display plate 300 may be bonded to each other through a sealing member.

The first display plate 200 may include a first substrate 210, a gate pattern GP, a gate insulating layer 220, a data pattern DP, a first passivation layer 250, a color filter CF, an organic insulating layer 260, a second passivation layer 270, and a transparent conductive pattern TP.

In one embodiment, the first substrate 210 may be a transparent insulating substrate. The transparent insulating substrate may include glass, quartz, transparent plastic, and the like. In another embodiment, the first substrate 210 may be a flexible substrate or a structure in which a plurality of films are laminated.

The gate pattern GP may be disposed on the first substrate 210. The gate pattern GP may include a scan line SL, a first control electrode CE1, a second control electrode CE2, a first storage line RL1, a first storage electrode RE1, a second storage line RL2, and a second storage electrode RE2.

The scan line SL may extend in the second direction D2. The first control electrode CE1 may be a part of the scan line SL and protrude from the scan line SL along the first direction DR1, and the second control electrode CE2 may be another part of the scan line SL and protrude from the scan line SL along a fourth direction DR4.

The storage line RL1 may be substantially parallel to the scan line SL and spaced apart from scan line SL in the fourth direction DR4 opposite to the first direction DR1. The storage line RL1 may be disposed on the same layer as the scan line SL. In one embodiment, the storage line RL1 may be disposed to surround at least a part of a side portion of the first pixel electrode PE1.

The storage line RL1 may overlap at least a part of the first pixel electrode PE1. When the first pixel electrode PE1 overlaps the first storage line RL1, the first storage capacitor Cst1 may be formed.

The first storage electrode RE1 may protrude from the first storage line RL1. In one embodiment, the first storage electrode RE1 may protrude in the first direction DR1 from the first storage line RL1. The first storage electrode RE1 may overlap at least a part of a first contact portion CP1 to be described later. When the first contact portion CP1 overlaps the first storage electrode RE1, the first storage capacitor Cst1 may be formed.

The storage line RL2 may be substantially parallel to the scan line SL and spaced apart from the scan line SL in the first direction DR1. The storage line RL2 may be disposed on the same layer as the scan line SL. In one embodiment, the storage line RL2 may be disposed to surround at least a part of a side portion of the second pixel electrode PE2.

The storage line RL2 may overlap at least a part of the second pixel electrode PE2. When the second pixel electrode PE2 overlaps the second storage line RL2, the second storage capacitor Cst2 may be formed.

The second storage electrode RE2 may protrude from the second storage line RL2. In one embodiment, the second storage electrode RE2 may protrude in the fourth direction DR4 from the first storage line RL2. The second storage electrode RE2 may overlap at least a part of a second contact portion CP2 to be described later. When the second contact portion CP2 overlaps the second storage electrode RE2, the second storage capacitor Cst2 may be formed.

The gate pattern GP may be formed of a single film selected from one, a double film selected from two, or a triple film selected from three among aluminum (Al), copper (Cu), molybdenum (Mo), chromium (Cr), titanium (Ti), and tungsten (W). The scan line SL, the first control electrode CE1, the second control electrode CE2, the first storage line RL1, the first storage electrode RE1, the second storage line RL2, and the second storage electrode RE2 included in the gate pattern GP may be formed substantially and simultaneously through the same mask process.

The gate insulating layer 220 may be disposed on the gate pattern GP. In one embodiment, the gate insulating layer 220 may be formed of silicon nitride, silicon oxide, or the like. The gate insulating layer 220 may have a multi-layer structure including at least two insulating layers having different physical properties.

The data pattern DP may be disposed on the gate insulating layer 220. The data pattern DP may include a first data line DL1, a second data line DL2, a first input electrode IE1, a first output electrode OE1, a second input electrode IE2, a second output electrode OE2, and a semiconductor layer 230. A first channel area CH1 of the first transistor TR1 may be formed between the first input electrode TE1 and the first output electrode OE1 in the semiconductor layer 230, and a second channel area (not shown) of the second transistor TR2 may be formed between the second input electrode IE2 and the second output electrode OE2 in the semiconductor layer 230.

The semiconductor layer 230 may be disposed on the gate insulating layer 220. In one embodiment, the semiconductor layer 230 may be formed of amorphous silicon, polycrystalline silicon, or the like. In another embodiment, the semiconductor layer 230 may be formed of an oxide semiconductor. When the semiconductor layer 230 is formed of the oxide semiconductor, the semiconductor layer 230 may be formed of at least one selected from oxide semiconductors including IGZO, ZnO, ZnO2, CdO, SrO, SrO2, CaO, CaO2, MgO, MgO2, InO, In2O2, GaO, Ga2O, Ga2O3, SnO, SnO2, GeO, GeO2, PbO, Pb2O3, Pb3O4, TiO, TiO2, Ti2O3, and Ti3O5.

In one embodiment, the data pattern DP may further include an ohmic contact layer 240. The ohmic contact layer 240 may be disposed on the semiconductor layer 230. The ohmic contact layer 240 may be formed of a material such as n+ hydrogenated amorphous silicon doped with a high concentration of n-type impurities such as phosphorus, or may be formed of silicide. However, when the semiconductor layer 230 is formed of the oxide semiconductor, the ohmic contact layer 240 may be omitted. Hereinafter, in the specification herein, the data pattern DP will be described as including the ohmic contact layer 240.

The first data line DL1, the second data line DL2, the first input electrode IE1, the first output electrode OE1, the second input electrode IE2, and the second output electrode OE2 may be disposed on the gate insulating layer 220 and the ohmic contact layer 240.

The first input electrode IE1 may protrude from the first data line DL1 so that at least a part of the first input electrode IE1 may overlap the first control electrode CE1. At least a part of the first output electrode OE1 may overlap the first control electrode CE1 and be spaced apart from the first input electrode IE1 in the third direction DR3. Meanwhile, the first output electrode OE1 may include a first contact portion CP1. The first contact portion CP1 may overlap the first storage electrode RE1 and the first pixel electrode PE1. In one embodiment, the first contact portion CP1 may be spaced apart first input electrode IE1 in the fourth direction DR4. For example, the first contact portion CP1 may be substantially positioned in the fourth direction DR4 from the first transistor TR1 and may be positioned in the second direction DR2 from the second transistor TR2, when viewed from the top.

The second input electrode IE2 may protrude from the second data line DL2 so that at least a part of the second input electrode IE2 may overlap the second control electrode CE2. The second output electrode OE2 may at least partially overlap the second control electrode CE2 and may be spaced apart from the second input electrode IE2 in the second direction DR2. Meanwhile, the second output electrode OE2 may include a second contact portion CP2. The second contact portion CP2 may overlap the second storage electrode RE2 and the second pixel electrode PE2. In one embodiment, the second contact portion CP2 may be spaced apart from the second input electrode IE2 in the first direction DR1. For example, the second contact portion CP2 may be substantially positioned in the first direction DR1 from the second transistor TR2 and may be positioned in the third direction DR3 from the first transistor TR1, when viewed from the top.

The first control electrode CE1, the first input electrode IE1, and the first output electrode OE1 may form the first transistor TR1. The second control electrode CE2, the second input electrode IE2, and the second output electrode OE2 may form the second transistor TR2.

The first input electrode TE1 and the second input electrode IE2 may be disposed in the same direction from the first output electrode OE1 and the second output electrode OE2, respectively. In one embodiment, the first input electrode TE1 may be disposed in the second direction DR2 from the first output electrode OE1, and the second input electrode IE2 may be disposed in the second direction DR2 from the second output electrode OE2, respectively. In this case, the second input electrode IE2 may be disposed between the first output electrode OE1 and the second output electrode OE2. However, the present disclosure is not limited thereto. In another embodiment, the first input electrode TE1 may be disposed in the third direction DR3 from the first output electrode OE1, and the second input electrode IE2 may be disposed in the third direction DR3 from the second output electrode OE2, respectively.

Since the first input electrode IE1 and the second input electrode IE2 are disposed in the same direction from the first output electrode OE1 and the second output electrode OE2, respectively, a process error may exert substantially the same effect on the first pixel PX1 and the second pixel PX2 even when the process error occurs in the process of forming the data pattern DP on the gate pattern GP. However, when the first input electrode TE1 and the second input electrode IE2 are disposed in the second direction DR2 from the first output electrode OE1 and the second output electrode OE2, respectively, a distance between the first input electrode IE1 and the second output electrode OE2 may be greater than a distance between the second input electrode IE2 and the first output electrode OE1. Accordingly, a capacitance between the first input electrode TE1 and the second output electrode OE2 may be smaller than a capacitance between the second input electrode IE2 and the first output electrode OE1. Thus, the capacitance between the first data line DL1 connected to the first input electrode TE1 and the second pixel PX2 including the second output electrode OE2 may be smaller than the capacitance between the second data line DL2 connected to the second input electrode IE2 and the first pixel PX1 including the first output electrode OE1. Thus, the image quality properties of the display device may deteriorate due to the capacitance deviation between the capacitance between the first data line DL1 and the second pixel PX2 and the capacitance between the second data line DL2 and the first pixel PX1.

In order to reduce the capacitance deviation, the first input electrode IE1 may include a first extension portion EP1 extending toward the second output electrode OE2. In one embodiment, the first input electrode TE1 may be disposed between the first output electrode OE1 and the first data line DL1, and the second input electrode IE2 may be disposed between the first output electrode OE1 and the second output electrode OE2.

In one embodiment, the first extension portion EP1 may include a first portion PP1 extending in the third direction DR3 and a second portion PP2 extending in the fourth direction DR4 from the first portion PP1. The second portion PP2 may be disposed between the first output electrode OE1 and the second contact portion CP2. When the first extension portion EP1 includes the second portion PP2 disposed between the first output electrode OE1 and the second output electrode OE2, the capacitance between the first input electrode TE1 and the second output electrode OE2 may increase.

Figure 9:
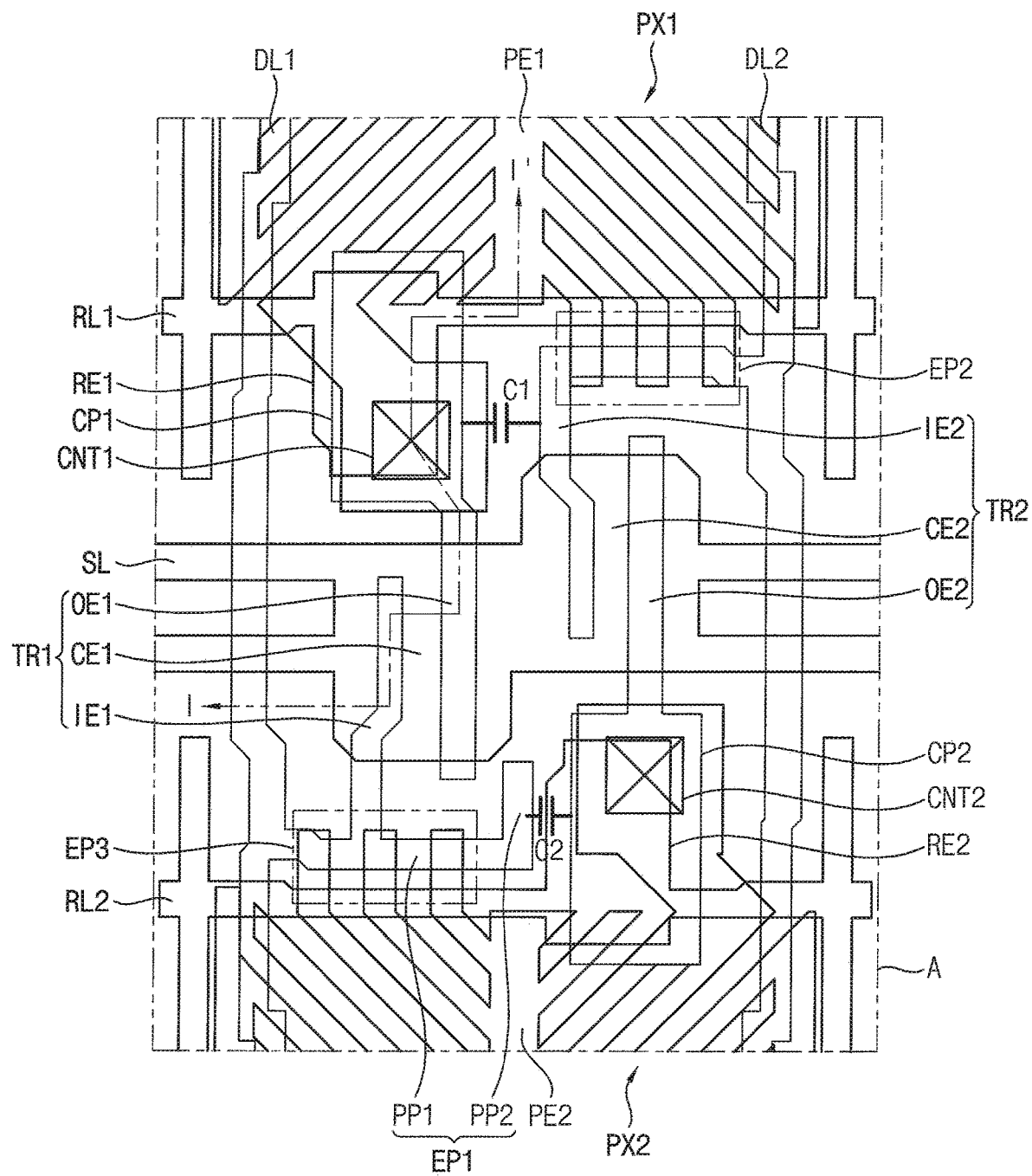
FIG. 9 is a view for showing the capacitance between the first pixel and the second data line and the capacitance between the second pixel and the first data line.

FIG. 9 is a view for showing the capacitance between the first pixel PX1 and the second data line DL2 and the capacitance between the second pixel PX2 and the first data line DL1.

Referring to FIG. 9, a capacitance C1 disposed between the first contact portion CP1 and the second input electrode IE2 may be substantially equal to a capacitance C2 disposed between the second contact portion CP2 and the first extension portion EP1. When the first input electrode TE1 includes the first extension portion EP1, a capacitance deviation, between the capacitance which is disposed between the first pixel PX1 including the first contact portion CP1 and the second data line DL2 connected to the second input electrode IE2 and the capacitance which is disposed between the second pixel PX2 including the second contact portion CP2 and the first data line DL1 connected to the first input electrode IE1, may be reduced.

Referring back to FIGS. 3, 4, 5, 6, 7, and 8, the data pattern DP may be formed of a single film selected from one, a double film selected from two, or a triple film selected from three among aluminum (Al), copper (Cu), molybdenum (Mo), chromium (Cr), titanium (Ti), and tungsten (W). The first data line DL1, the second data line DL2, the first input electrode IE1, the first output electrode OE1, the second input electrode IE2, the second output electrode OE2, the semiconductor layer 230, and the ohmic contact layer 240 included in the data pattern DP may be formed substantially simultaneously through the same mask process.

The first passivation layer 250 may be disposed on the data pattern DP. The first passivation layer 250 may include openings so that each of the openings exposes at least a part of the first contact portion CP1 and at least a part of the second contact portion CP2 respectively. In one embodiment, the first passivation layer 250 may be formed of an inorganic insulating material such as silicon nitride and silicon oxide. The first passivation layer 250 may prevent the pigment of the organic insulating layer 260 from flowing into the first channel area CH1 and the second channel area.

The color filter CF may be disposed on the first passivation layer 250. The color filter CF may include openings that overlap the openings of the first passivation layer 250, respectively, and expose at least a part of the first contact portion CP1 and at least a part of the second contact portion CP2.

The light passing through the color filter CF may express one of primary colors such as red, green, and blue. However, the expressed color of the light passing through the color filter CF is not limited to the primary color, and may express any one of cyan, magenta, yellow, and white. In one embodiment, the color filter CF may be formed of a material expressing a color different from each pixel adjacent in the second direction DR2, and may be formed of a material expressing the same color as each pixel adjacent in the first direction DR1 (for example, the first pixel PX1 and the second pixel PX2). However, the present disclosure is not limited thereto. In another embodiment, the color filter CF may be formed of a material that expresses a different color for each adjacent pixel regardless of the direction. Unlike FIG. 8 showing that the color filter CF is disposed in the first display plate 200, the color filter CF may be disposed in the second display plate 300.

The organic insulating layer 260 may be disposed on the first passivation layer 250 and the color filter CF. The organic insulating layer 260 may include openings that overlap the openings of the first passivation layer 250, respectively, and expose at least a part of the first contact portion CP1 and at least a part of the second contact portion CP2. The organic insulating layer 260 may include an organic material having excellent planarization properties and having photosensitivity. However, in another embodiment, the organic insulating layer 260 may be omitted.

The passivation layer 270 may be disposed on the organic insulating layer 260. The passivation layer 270 may include openings that overlap the openings of the first passivation layer 250, respectively, and expose at least a part of the first contact portion CP1 and at least a part of the second contact portion CP2. In one embodiment, the passivation layer 270 may be formed of an inorganic insulating material such as silicon nitride and silicon oxide. However, in another embodiment, the passivation layer 270 may be omitted.

The openings of the first passivation layer 250, the openings of the color filter CF, the openings of the organic insulating layer 260, and the openings of the second passivation layer 270 may form a first contact hole CNT1 and a second contact hole CNT2.

The transparent conductive pattern TP may be disposed on the second passivation layer 270. The transparent conductive pattern TP may include a transparent conductive material. In one embodiment, the transparent conductive material may include polycrystalline, single crystalline, or amorphous indium tin oxide (ITO).

The transparent conductive pattern TP may include a first pixel electrode PE1 and a second pixel electrode PE2. The first pixel electrode PE1 and the second pixel electrode PE2 may be disposed on the same layer, and physically and electrically insulated from each other.

The first pixel electrode PE1 may come into directly contact with the first contact portion CP1 exposed through the first contact hole CNT1. In addition, the first pixel electrode PE1 may overlap the common electrode CM. Accordingly, the first liquid crystal capacitor Clc1 in FIG. 2 may be formed between the first pixel electrode PE1 and the common electrode CM overlapping each other.

The first pixel electrode PE1 may include a first stem portion PE1a1 extending in the first direction DR1, a second stem portion (not shown) intersecting the first stem portion PE1a1 and extending in the second direction DR2, an edge stem portion PE1a2 physically connected to the first stem portion PE1a1 and the second stem portion (not shown) and physically connected to ends of a plurality of branch portions (not shown) described later, and a connecting stem portion PE1a3 physically spaced apart from the first stem portion PE1a1, the second stem portion, and the edge stem portion PE1a2 and including a connecting portion PE1c.

The connecting portion PE1c may be defined as an area overlapping the first contact hole CNT1. Accordingly, the connecting portion PE1c of the first pixel electrode PE1 may be directly connected to the first contact portion CP1 exposed by the first contact hole CNT1.

The first pixel electrode PE1 may include a first branch portion PE1b1, a second branch portion PE1b2, a third branch portion (not shown), and a fourth branch portion (not shown) that extend from the first stem portion PE1a1 and the second stem portion (not shown).

The first branch portion PE1b1 may extend in a fifth direction DR5 from the first stem portion PE1a1 and the second stem portion (not shown), a part of the first branch portion PE1b1 may be physically connected to the edge stem portion PE1a2, and another part of the first branch portion PE1b1 may be physically connected to the connecting stem portion PE1a3. The second branch portion PE1b2 may extend in a sixth direction DR6 from the first stem portion PE1a1 and the second stem portion, a part of the second branch portion PE1b2 may be physically connected to the edge stem portion PE1a2, and another part of the second branch portion PE1b2 may not be physically connected to the edge stem portion PE1a2. The third branch portion may extend in a seventh direction DR7 from the first stem portion PE1a1 and the second stem portion, and may be physically connected to the edge stem portion PE1a2. The fourth branch portion may extend in an eighth direction DR8 from the first stem portion PE1a1 and the second stem portion, and may be physically connected to the edge stem portion PE1a2.

The stem portions may be electrically connected to the branch portions in the first pixel electrode PE1. Accordingly, the stem portions and the branch portions in the first pixel electrode PE1 may have the same potential.

The second pixel electrode PE2 may come into directly contact with the second contact portion CP2 exposed through the second contact hole CNT2. In addition, the second pixel electrode PE2 may overlap the common electrode CM. Accordingly, the second liquid crystal capacitor Clc2 in FIG. 2 may be formed between the second pixel electrode PE2 and the common electrode CM overlapping each other.

The second pixel electrode PE2 may include a first stem portion PE2a1 extending in the first direction DR1, a second stem portion (not shown) intersecting the first stem portion PE2a1 and extending in the second direction DR2, an edge stem portion PE2a2 physically connected to the first stem portion PE2a1 and the second stem portion and physically connected to ends of a plurality of branch portions (not shown) described later, and a connecting stem portion PE2a3 physically spaced apart from the first stem portion PE2a1, the second stem portion, and the edge stem portion PE2a2 and including a connecting portion PE2c.

The connection portion PE2c may be defined as an area overlapping the second contact hole CNT2. Accordingly, the connection portion PE2c of the second pixel electrode PE2 may be directly connected to the second contact portion CP2 exposed by the second contact hole CNT2.

The second pixel electrode PE2 may include a first branch portion PE2b1, a second branch portion PE2b2, a third branch portion (not shown), and a fourth branch portion (not shown) that extend from the first stem portion PE2a1 and the second stem portion.

The first branch portion PE2b1 may extend in an eighth direction DR8 from the first stem portion PE2a1 and the second stem portion, a part of the first branch portion PE2b1 may be physically connected to the edge stem portion PE2a2, and another part of the first branch portion PE2b1 may be physically connected to the connection stem portion PE2a3. The second branch portion PE1b2 may extend in a seventh direction DR7 from the first stem portion PE2a1 and the second stem portion, a part of the second branch portion PE2b2 may be physically connected to the edge stem portion PE2a2, and another part of the second branch portion PE2b2 may not be physically connected to the edge stem portion PE2a2. The third branch portion may extend in the sixth direction DR6 from the first stem portion PE2a1 and the second stem portion, and may be physically connected to the edge stem portion PE2a2. The fourth branch portion may extend in the fifth direction DR5 from the first stem portion PE2a1 and the second stem portion, and may be physically connected to the edge stem portion PE2a2.

The stem portions may be electrically connected to the branch portions in the second pixel electrode PE2. Accordingly, the stem portions and the branch portions in the second pixel electrode PE2 may have equal potential.

A distance between the first output electrode OE1 and the first data line DL1 may be smaller than a distance between the first output electrode OE1 and the second input electrode IE2 when viewed from the top, and accordingly, the capacitance between the first output electrode OE1 and the second input electrode IE2 may be smaller than the capacitance between the first output electrode OE1 and the first data line DL1. Thus, the capacitance between the first pixel PX1 including the first output electrode OE1 and the second data line DL2 connected to the second input electrode IE2 may be smaller than the capacitance between the first pixel PX1 and the first data line DL1, and the image quality properties of the display device may deteriorate due to the capacitance deviation between the first pixel PX1 and the first and second data lines DL1 and DL2.

In order to reduce the capacitance deviation, the first pixel electrode PE1 may include a second extension portion EP2 extending in the first direction DR1 to overlap the second input electrode IE2. In one embodiment, the second extension portion EP2 may extend from the second branch portion PE1$b$2 of the first pixel electrode PE1. For example, the second extension portion EP2 may extend in the first direction DR1 from the second branch portion PE1$b$2 of the first pixel electrode PE1. When the first pixel electrode PE1 connected to the first output electrode OE1 includes the second extension portion EP2 extending to overlap the second input electrode IE2, the capacitance between the first output electrode OE1 and the second input electrode IE2 may increase.

Figure 10:
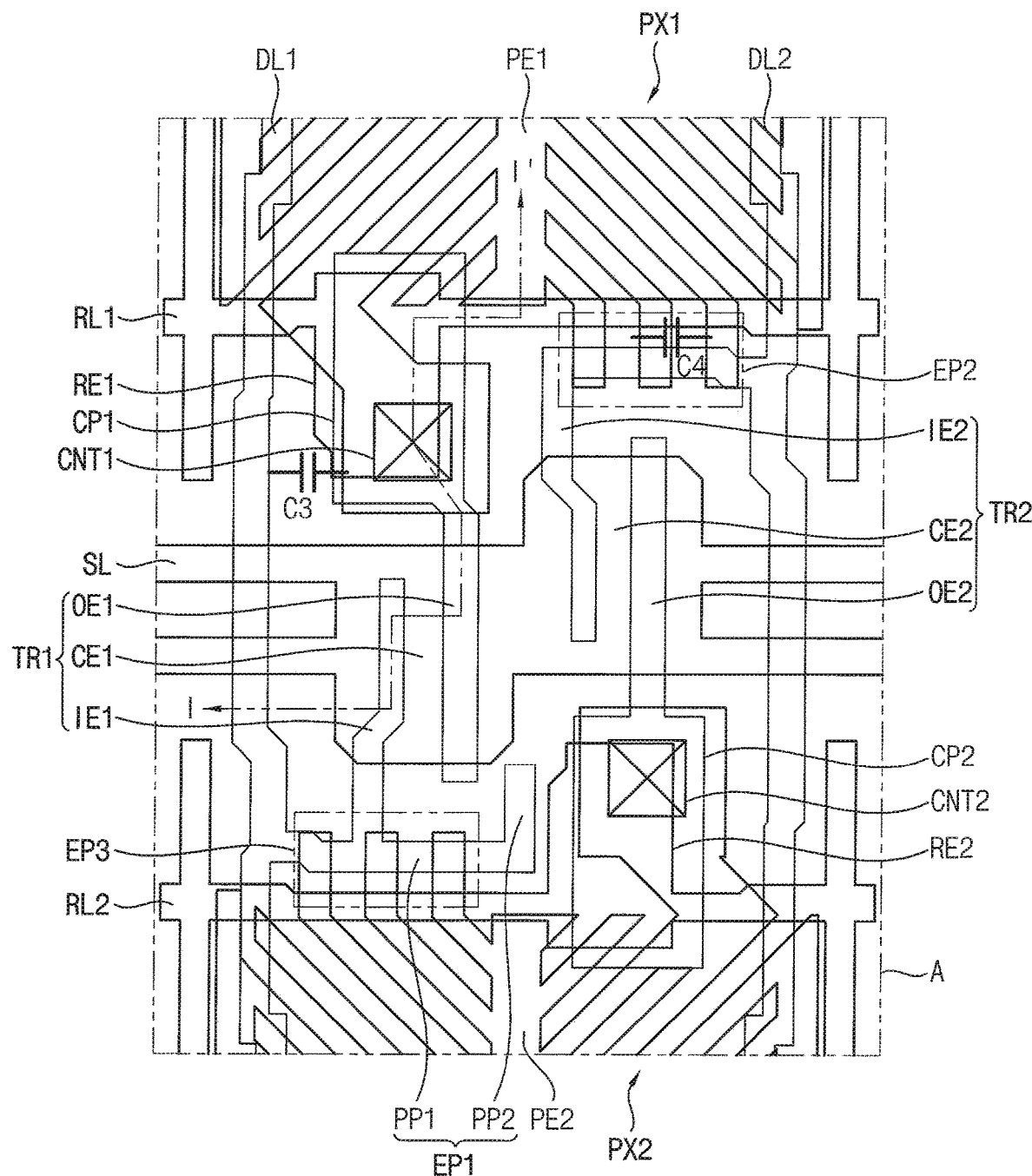
FIG. 10 is a view for showing the capacitance between the first pixel and the first data line and the capacitance between the first pixel and the second data line.

FIG. 10 is a view for showing the capacitance between the first pixel PX1 and the first data line DL1 and the capacitance between the first pixel PX1 and the second data line DL2.

Referring to FIG. 10, a capacitance C3 disposed between the first output electrode OE1 and the first data line DL1 may be substantially equal to a capacitance C4 disposed between the second input electrode IE2 and the second extension portion EP2. When the first pixel electrode PE1 includes the second extension portion EP2, the capacitance deviation, between the capacitance which is disposed between the first pixel PX1 including the first output electrode OE1 and the second data line DL2 connected to the second input electrode IE2 and the capacitance which is disposed between the first pixel PX1 and the first data line DL1, may decrease.

Referring back to FIGS. 3, 4, 5, 6, 7, and 8, a distance between the second output electrode OE2 and the second data line DL2 may be smaller than a distance between the second output electrode OE2 and the first input electrode IE1 when viewed from the top. Accordingly, the capacitance between the second output electrode OE2 and the first input electrode IE1 may be smaller than the capacitance between the second output electrode OE2 and the second data line DL2. Thus, the capacitance between the second pixel PX2 including the second output electrode OE2 and the first data line DL1 connected to the first input electrode IE1 may be smaller than the capacitance between the second pixel PX2 and the second data line DL2, and the image quality properties of the display device may deteriorate due to the capacitance deviation between the second pixel PX2 and the first and second data lines DL1 and DL2.

In order to reduce the capacitance deviation, the second pixel electrode PE2 may include a third extension portion EP3 extending in the fourth direction DR4 to overlap the first input electrode IE1. In one embodiment, the third extension portion EP3 may extend from the second branch portion PE2$b$2 of the second pixel electrode PE2. For example, the third extension portion EP3 may extend in the fourth direction DR4 from the second branch portion PE2$b$2 of the second pixel electrode PE2. When the second pixel electrode PE2 connected to the second output electrode OE2 includes the third extension portion EP3 extending to overlap the first input electrode IE1, the capacitance between the second output electrode OE2 and the first input electrode TE1 may increase.

Figure 11:
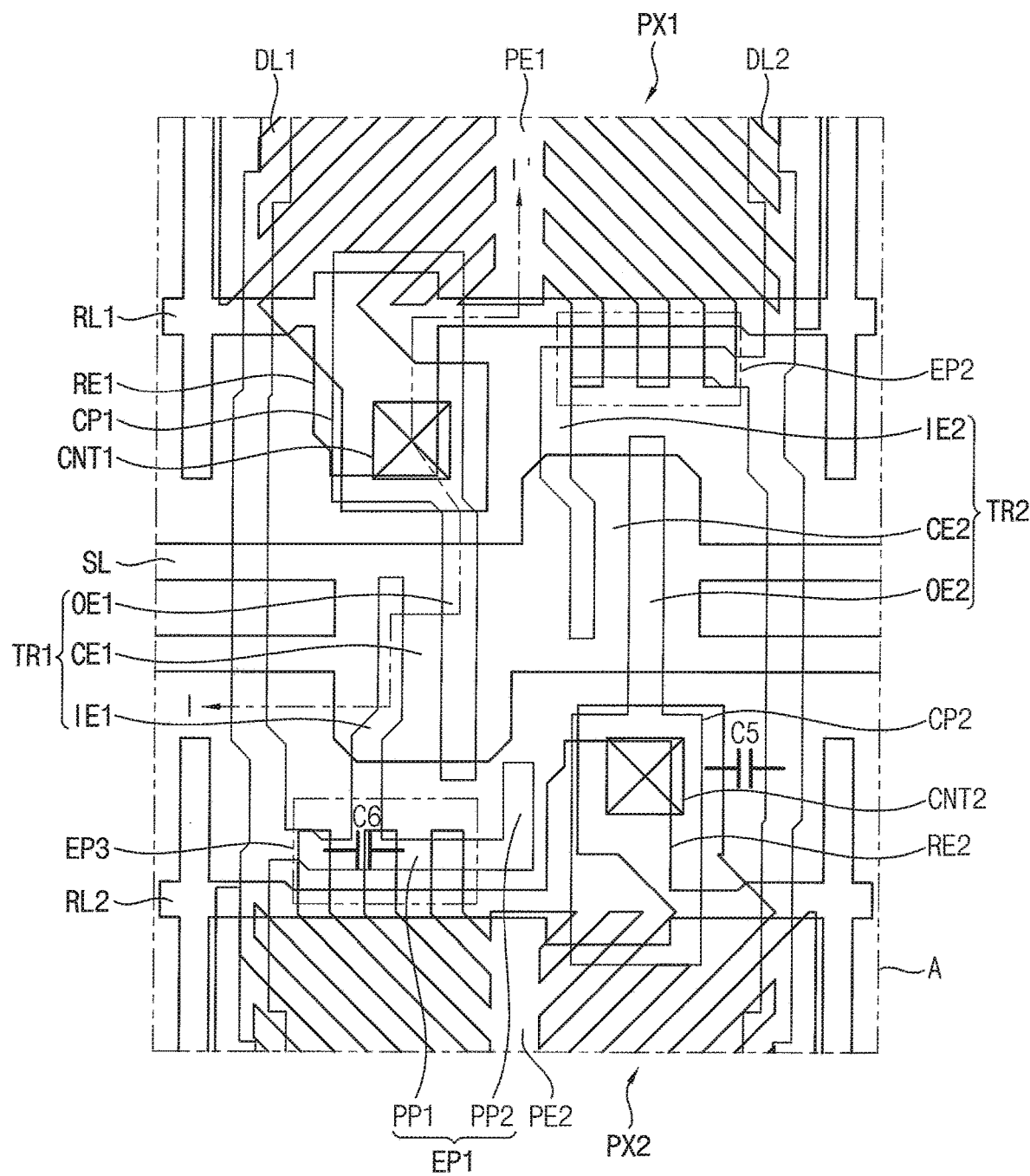
FIG. 11 is a view for showing the capacitance between the second pixel and the second data line and the capacitance between the second pixel and the first data line.

FIG. 11 is a view for showing the capacitance between the second pixel PX2 and the second data line DL2 and the capacitance between the second pixel PX2 and the first data line DL1.

Referring to FIG. 11, a capacitance C5 disposed between the second output electrode OE2 and the second data line DL2 may be substantially equal to a capacitance C6 disposed between the first input electrode IE1 and the third extension portion EP3. When the second pixel electrode PE2 includes the third extension portion EP3, the capacitance deviation, between the capacitance which is disposed between the second pixel PX2 including the second output electrode OE2 and the first data line DL1 connected to the first input electrode IE1 and the capacitance which is disposed between the second pixel PX2 and the second data line DL2, may decrease.

Referring back to FIGS. 3, 4, 5, 6, 7 and 8, the alignment layer may be disposed on the transparent conductive pattern TP. The alignment layer may induce an initial alignment of the liquid crystal molecules 410 in the liquid crystal layer 400.

The second display plate 300 may include a second substrate 310, a black matrix BM, a planarization layer 320, and a common electrode CM.

The second substrate 310 may be disposed to face the first substrate 210. The second substrate 310 may be a transparent insulating substrate. In one embodiment, the second substrate 310 may be formed of the same material as the first substrate 210.

The black matrix BM may be disposed on the second substrate 310. The black matrix BM may be disposed in the second direction DR2 in an inactive area. The inactive area may be an area as a boundary between pixels adjacent in the first direction DR1 (for example, between the first pixel PX1 and the second pixel PX2) in which the branch portions of the first and second pixel electrodes PE1 and PE2 are not disposed. The black matrix BM may extend in the second direction DR2, and may be disposed to overlap the scan line SL.

The black matrix BM may block light from being transmitted to the inactive area. In one embodiment, the black matrix BM may be formed of a photosensitive composition, an organic material, a metallic material, and the like. For example, the photosensitive composition may include binder resin, polymeric monomer, polymeric oligomer, pigment, dispersant, and the like. In addition, the metallic material may include chromium (Cr) and the like.

The black matrix BM extending in the first direction DR1 may not be disposed between the pixels adjacent in the second direction DR2. The spacing between the pixels adjacent in the second direction DR2 may be adjusted, so that the liquid crystal alignment may be adjusted to prevent light from passing between the pixels adjacent in the second direction DR2 even without the black matrix BM.

The planarization layer 320 may be disposed on the black matrix BM. The planarization layer 320 may provide a flat surface on the common electrode CM. In one embodiment, the planarization layer 320 may be formed of an organic material or an inorganic material.

The common electrode CM may be disposed on the planarization layer 320. At least a part of the common electrode CM may overlap the first pixel electrode PE1 and the second pixel electrode PE2. In one embodiment, the common electrode CM may be formed of a transparent conductive material such as ITO or IZO, or a reflective metal such as aluminum (Al), silver (Ag), chromium (Cr), or an alloy thereof.

A second alignment layer may be disposed on the common electrode CM. The second alignment layer may induce an initial alignment of the liquid crystal molecules 410 in the liquid crystal layer 400. In one embodiment, the second alignment layer may be formed of a material the substantially same as the first alignment layer.

The liquid crystal layer 400 may include a plurality of liquid crystal molecules 410. In one embodiment, the liquid crystal molecules 410 may be vertically aligned in the initial alignment state while having negative dielectric anisotropy. The liquid crystal molecules 410 may have a predetermined pretilt angle in the initial alignment state. The initial alignment of the liquid crystal molecules 410 may be induced by the first alignment layer and the second alignment layer. When an electric field is formed between the first display plate 200 and the second display plate 300, the liquid crystal molecules 410 may tilt or rotate in a specific direction, thereby changing a polarization state of light passing through the liquid crystal layer 400.

The display device according to the embodiments may be applied to a display device included in a computer, a notebook, a mobile phone, a smartphone, a smart pad, a PMP, a PDA, an MP3 player, or the like.

Although the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:
   a first pixel including a first transistor having a first control electrode, a first input electrode, and a first output electrode spaced apart from the first input electrode and a first pixel electrode connected to the first output electrode;
   a second pixel adjacent to the first pixel which is disposed in a first direction and including a second transistor having a second control electrode, a second input electrode, and a second output electrode spaced apart from the second input electrode and a second pixel electrode connected to the second output electrode; and
   a scan line configured to provide a scan signal to the first control electrode and the second control electrode,
   wherein the first input electrode is disposed in a second direction intersecting the first direction from the first output electrode, and the second input electrode is disposed in the second direction from the second output electrode, and the first input electrode includes a first extension portion extending toward the second output electrode,
   wherein the first input electrode is physically separated from the second input electrode,
   wherein the second output electrode includes a second contact portion coming into contact with the second pixel electrode and disposed in the first direction from the second input electrode, and
   wherein at least a portion of the first extension portion is disposed between the first output electrode and the second contact portion.

2. The display device of claim 1, wherein the first extension portion includes a first portion extending in a third direction opposite to the second direction.

3. The display device of claim 2, wherein the first extension portion further includes a second portion extending from the first portion in a fourth direction opposite to the first direction.

4. The display device of claim 3, wherein the second output electrode includes a second contact portion coming into contact with the second pixel electrode and disposed in the first direction from the second input electrode.

5. The display device of claim 4, wherein the second portion is disposed between the first output electrode and the second contact portion.

6. The display device of claim 4, wherein a capacitance between the first contact portion and the second input electrode is substantially equal to a capacitance between the second contact portion and the first extension portion.

7. The display device of claim 4, further comprising:
   a first storage line overlapping the first pixel electrode and parallel to the scan line; and
   a second storage line overlapping the second pixel electrode and parallel to the scan line.

8. The display device of claim 7, wherein a first storage electrode protrudes from the first storage line in the first direction to overlap the first contact portion, and a second storage electrode protrudes from the second storage line in the fourth direction to overlap the second contact portion.

9. The display device of claim 1, further comprising:
   a first data line extending in the first direction and providing a first data signal to the first input electrode; and
   a second data line extending in the first direction and providing a second data signal to the second input electrode,
   wherein the first data line is connected to the first input electrode, and the second data line is connected to the second input electrode, respectively.

10. The display device of claim 9, wherein the first pixel electrode includes a second extension portion extending to overlap the second input electrode.

11. The display device of claim 10, wherein the first pixel electrode includes a stem portion extending in the first direction and a branch portion extending from the stem portion, and the second extension portion protrudes from the branch portion.

12. The display device of claim 10, wherein a capacitance between the first data line and the first output electrode is substantially equal to a capacitance between the second input electrode and the second extension portion.

13. The display device of claim 9, wherein the second pixel electrode includes a third extension portion extending to overlap the first input electrode.

14. The display device of claim 13, wherein the second pixel electrode includes a stem portion extending in the first direction and a branch portion extending from the stem portion, and the third extension portion protrudes from the branch portion.

15. The display device of claim 13, wherein a capacitance between the second data line and the second output electrode is substantially equal to a capacitance between the first input electrode and the third extension portion.

16. A display device comprising:
a first pixel including a first transistor including a first control electrode, a first input electrode, and a first output electrode spaced apart from the first input electrode, and a first pixel electrode connected to the first output electrode;
a second pixel adjacent to the first pixel in a first direction and including a second transistor including a second control electrode, a second input electrode, and a second output electrode spaced apart from the second input electrode, and a second pixel electrode connected to the second output electrode;
a scan line configured to provide a scan signal to the first control electrode and the second control electrode;
a first data line extending in the first direction and connected to the first input electrode to provide a first data signal to the first input electrode; and
a second data line extending in the first direction and connected to the second input electrode to provide a second data signal to the second input electrode,
wherein the first pixel electrode includes a second extension portion extending in the first direction to overlap the second input electrode and not to overlap the second data line.

17. The display device of claim 16, wherein a capacitance between the first data line and the first output electrode is substantially equal to a capacitance between the second input electrode and the second extension portion.

18. The display device of claim 16, wherein the second pixel electrode includes a third extension portion extending to overlap the first input electrode.

19. The display device of claim 18, wherein a capacitance between the second data line and the second output electrode is substantially equal to a capacitance between the first input electrode and the third extension portion.

20. A display device comprising:
a first pixel including a first transistor including a first control electrode, a first input electrode, and a first output electrode spaced apart from the first input electrode, and a first pixel electrode connected to the first output electrode;
a second pixel adjacent to the first pixel in a first direction and including a second transistor including a second control electrode, a second input electrode, and a second output electrode spaced apart from the second input electrode, and a second pixel electrode connected to the second output electrode;
a scan line configured to provide a scan signal to the first control electrode and the second control electrode;
a first data line extending in the first direction and connected to the first input electrode to provide a first data signal to the first input electrode; and
a second data line extending in the first direction and connected to the second input electrode to provide a second data signal to the second input electrode,
wherein the second pixel electrode includes a third extension portion extending in a fourth direction opposite to the first direction to overlap the first input electrode and not to overlap the first data line.

21. The display device of claim 20, wherein a capacitance between the second data line and the second output electrode is substantially equal to a capacitance between the first input electrode and the third extension portion.

* * * * *